(12) United States Patent
Pilote et al.

(10) Patent No.: US 10,619,927 B2
(45) Date of Patent: Apr. 14, 2020

(54) SOLIDS INJECTION LANCE

(71) Applicant: Tata Steel Limited, Mumbai (IN)

(72) Inventors: Jacques Pilote, Woodlands (AU); Rodney James Dry, City Beach (AU); Mark Preston Davis, West Shelley (AU)

(73) Assignee: Tata Steel Limited, Mumbai (IN)

( * ) Notice: Subject to any disclaimer, the term of this patent is extended or adjusted under 35 U.S.C. 154(b) by 426 days.

(21) Appl. No.: 14/891,112

(22) PCT Filed: May 2, 2014

(86) PCT No.: PCT/AU2014/000489
§ 371 (c)(1),
(2) Date: Nov. 13, 2015

(87) PCT Pub. No.: WO2014/183150
PCT Pub. Date: Nov. 20, 2014

(65) Prior Publication Data
US 2016/0116215 A1    Apr. 28, 2016

(30) Foreign Application Priority Data
May 16, 2013   (AU) .................. 2013901732

(51) Int. Cl.
F27D 3/00      (2006.01)
F27D 3/18      (2006.01)
F27B 3/18      (2006.01)
C21C 5/52      (2006.01)
C21C 5/46      (2006.01)
(Continued)

(52) U.S. Cl.
CPC .......... F27D 3/0033 (2013.01); C21C 5/4606 (2013.01); C21C 5/5217 (2013.01); F27B 3/18 (2013.01); F27D 3/0025 (2013.01); F27D 3/0026 (2013.01); F27D 3/16 (2013.01); F27D 3/18 (2013.01); F27B 2014/002 (2013.01); F27D 2003/168 (2013.01); F27D 2003/169 (2013.01); Y02P 10/216 (2015.11)

(58) Field of Classification Search
CPC ..................................................... C21C 5/4606
USPC ................................................. 266/225, 216
See application file for complete search history.

(56) References Cited

U.S. PATENT DOCUMENTS 6,398,842 B2    6/2002  Dunne
2011/0308354 A1*  12/2011  Dry ....................... C21C 5/4606
75/707

(Continued)

FOREIGN PATENT DOCUMENTS

| WO | 1996/031627 A1 | 10/1996 |
| WO | 2006/105578 A1 | 10/2006 |
| WO | 2014/179825 A1 | 11/2014 |

OTHER PUBLICATIONS

Jul. 7, 2014—(WO) International Search Report—PCT/AU2014/000489.

*Primary Examiner* — Scott R Kastler
(74) *Attorney, Agent, or Firm* — Banner & Witcoff, Ltd.

(57) ABSTRACT

A method for injecting a solid feed material through a solids injection lance includes creating flow conditions in an injection passageway of the lance so that at least a part of the feed material flowing along the passageway forms a buffer zone between a wall of a tube that defines the passageway and feed material flowing along a central section of the passageway.

15 Claims, 4 Drawing Sheets

(51) Int. Cl.
*F27D 3/16* (2006.01)
*F27B 14/00* (2006.01)

(56) References Cited

U.S. PATENT DOCUMENTS

| 2012/0067171 A1* | 3/2012 | Pilote | C21B 13/0013 |
| | | | 75/707 |
| 2016/0116215 A1* | 4/2016 | Pilote | F27B 3/18 |
| | | | 75/414 |

* cited by examiner

SOLIDS INJECTION LANCE

CROSS-REFERENCE TO RELATED APPLICATIONS

The present application is a U.S. National Phase filing of International Application No. PCT/AU2014/000489, filed on May 2, 2014, designating the United States of America and claiming priority to Australian Patent Application No. 2013901732 filed May 16, 2013, and the present application claims priority to and the benefit of both the above-identified applications, which are incorporated by reference herein in their entireties.

TECHNICAL FIELD

The present invention relates to injecting a solid feed material through a solids injection lance.

The present invention relates particularly, although by no means exclusively, to injecting a solid metalliferous material, typically a hot solid metalliferous material, and a solid carbonaceous material, typically a solid carbonaceous material at ambient temperature, through a solids injection lance.

The present invention relates particularly, although by no means exclusively, to injecting a solid feed material selected from one or more than one of a solid metalliferous material, typically a hot solid metalliferous material, and a solid carbonaceous material, typically a solid carbonaceous material, through a solids injection lance into a direct smelting vessel, such as a molten bath-based direct smelting vessel for producing molten metal, such as iron, in a direct smelting process.

BACKGROUND ART

A known molten bath-based smelting process is generally referred to as the "HIsmelt" process and is described in a considerable number of patents and patent applications in the name of the applicant.

The HIsmelt process is applicable to smelting metalliferous material generally but is associated particularly with producing molten iron from iron ore or another iron-containing material.

In the context of producing molten iron, the HIsmelt process includes the steps of:
(a) forming a bath of molten iron and slag in a main chamber of a direct smelting vessel;
(b) injecting into the molten bath: (i) iron ore, typically in the form of fines; and (ii) a solid carbonaceous material, typically coal, which acts as a reductant of the iron ore feed material and a source of energy; and
(c) smelting iron ore to iron in the bath.

The term "smelting" is herein understood to mean thermal processing wherein chemical reactions that reduce metal oxides take place to produce molten metal.

In the HIsmelt process solid feed materials in the form of metalliferous material (which may be pre-heated) and carbonaceous material and optionally flux material are injected with a carrier gas into the molten bath through a number of water-cooled solids injection lances which are inclined to the vertical so as to extend downwardly and inwardly through the side wall of the main chamber of the smelting vessel and into a lower region of the vessel so as to deliver at least part of the solid feed materials into the metal layer in the bottom of the main chamber. The solid feed materials and the carrier gas penetrate the molten bath and cause molten metal and/or slag to be projected into a space above the surface of the bath and form a transition zone. A blast of oxygen-containing gas, typically oxygen-enriched air or pure oxygen, is injected into an upper region of the main chamber of the vessel through a downwardly extending lance to cause post-combustion of reaction gases released from the molten bath in the upper region of the vessel. In the transition zone there is a favourable mass of ascending and thereafter descending droplets or splashes or streams of molten metal and/or slag which provide an effective medium to transfer to the bath the thermal energy generated by post-combusting reaction gases above the bath.

Typically, in the case of producing molten iron, when oxygen-enriched air is used, the oxygen-enriched air is generated in hot blast stoves and fed at a temperature of the order of 1200° C. into the upper region of the main chamber of the vessel. If technical-grade cold oxygen is used, the technical-grade cold oxygen is typically fed into the upper region of the main chamber at or close to ambient temperature.

Off-gases resulting from the post-combustion of reaction gases in the smelting vessel are taken away from the upper region of the smelting vessel through an off-gas duct.

The smelting vessel includes a main chamber for smelting metalliferous material and a forehearth connected to the main chamber via a forehearth connection that allows continuous metal product outflow from the vessel. The main chamber includes refractory-lined sections in a lower hearth and water-cooled panels in side walls and a roof of the main chamber. Water is circulated continuously through the panels in a continuous circuit. The forehearth operates as a molten metal-filled siphon seal, naturally "spilling" excess molten metal from the smelting vessel as it is produced. This allows the molten metal level in the main chamber of the smelting vessel to be known and controlled to within a small tolerance—this is essential for plant safety.

The HIsmelt process enables large quantities of molten iron, typically at least 0.5 Mt/a, to be produced by smelting in a single compact vessel.

In order to enable such levels of production, large quantities of both solid metalliferous material and solid carbonaceous material must be supplied to the vessel.

The present invention provides an effective and reliable method of co-injecting solid metalliferous material and solid carbonaceous material and optionally solid flux material into a direct smelting vessel.

The present invention also provides an effective and reliable solids injection lance for co-injecting solid metalliferous material and solid carbonaceous material and optionally solid flux material into a direct smelting vessel.

The present invention also provides an effective apparatus and process for delivering solid metalliferous material and solid carbonaceous material and optionally solid flux material to a direct smelting vessel.

The above description is not to be taken as an admission of the common general knowledge in Australia or elsewhere.

SUMMARY OF THE DISCLOSURE

The present invention is a method for injecting a solid feed material through a solids injection lance that includes creating flow conditions in an injection passageway of the lance so that at least a part of the feed material flowing along the passageway forms a buffer zone between a wall of a tube that defines the passageway and feed material flowing along a central section of the passageway.

The present invention is also a solids injection lance that is capable of creating the above-described buffer zone.

Appropriate selection of solid feed material for the buffer zone makes it possible to minimise abrasive wear and/or thermal shock of the tube, which are potentially serious issues from the perspective of providing effective and reliable operation of the solids injection lance over an extended campaign.

The solid feed material may be any suitable material.

The solid feed material may include metalliferous material.

The solid feed material may include metalliferous material and carbonaceous material.

The solid feed material may include metalliferous material, carbonaceous material, and flux material.

The present invention extends to situations in which there is metalliferous material and carbonaceous material injected via the lance. For example, the buffer zone material may be carbonaceous material only or a mixture of carbonaceous material and metalliferous material. The central section material may be metalliferous material or a mixture of carbonaceous material and metalliferous material. Typically, the central section material is predominantly, i.e. greater than 70% by weight, metalliferous material. The carbonaceous material may be at ambient temperature and the metalliferous material may be hot. When the metalliferous material is iron ore, the iron ore may be at least 500° C. The carbonaceous material and the metalliferous material may be at ambient temperature.

The present invention also extends to situations in which there is only metalliferous material injected via the lance. The metalliferous material in the buffer zone may be different to the metalliferous material in the central section of the passageway. For example, the buffer zone material may be fines material and the central section material may be larger particle size material, such as granular material. The buffer zone material may be at ambient temperature and the central section material may be hot material. When the metalliferous material is iron ore, the iron ore may be at least 500° C. The buffer zone material and the central section material may be at ambient temperature.

The present invention also extends to situations in which a flux material is injected with carbonaceous material.

The present invention is not limited to the situations described in the preceding three paragraphs.

The following description of the present invention focuses on co-injection of metalliferous material and carbonaceous material, but as will be appreciated from the preceding paragraphs the invention is not limited to co-injection of these materials.

Where abrasive wear of the tube due to contact with metalliferous material is the major consideration and thermal shock of the tube is a secondary consideration, carbonaceous material in the buffer zone is an advantage because carbonaceous material is typically less abrasive than metalliferous material.

Where thermal shock of the tube is the major consideration and abrasive wear of the tube is a secondary consideration, the key consideration is that the feed material in the buffer zone comprise relatively cold material or a mixture of relatively cold materials (preferably ambient temperature) compared to the temperature of the feed material in the central section of the lance. Therefore, the selection of the buffer zone material may include any one or more than one of carbonaceous material, metalliferous material, and a mixture of carbonaceous material and metalliferous material, all preferably at ambient temperature.

The buffer zone may be a continuous zone.

The buffer zone may be a uniform thickness.

It is noted that from a practical perspective the buffer zone may not be a continuous zone and may not be a uniform thickness. However, even in this situation, from a comparative viewpoint, the buffer zone will reduce the abrasive wear and/or thermal shock issues (depending on feed material selection) compared to situations in which there is no buffer zone.

It is also noted that ultimately there will be mixing of the feed materials in the buffer zone and the central section of the passageway as the feed materials flow along the passageway so that eventually there is a uniform mixture of the feed materials flowing along the passageway.

The method may include forming the buffer zone so that it extends at least partly along the length of a tapered section of a venturi in a section of the tube that accelerates material flowing in the passageway.

The method may include forming the buffer zone so that it extends along the whole of the length of the tapered section of the venturi.

The method may include forming the buffer zone so that it extends along the whole of the length of the tapered section of the venturi and forwardly of the tapered section.

Basically, the method may include selecting the operating conditions to form the buffer zone so that it extends along the required length of the tube to shield sections of the tube that are susceptible to high abrasive wear or thermal shock.

The method may include establishing a flow of a metalliferous material along the passageway and supplying a flow of another feed material into the passageway in a direction that is transverse, typically perpendicular, to the direction of movement of the metalliferous material along the passageway whereby the flow of metalliferous material diverts the flow of the other feed material into the passageway to form the buffer zone.

The other feed material may be a carbonaceous material only, a metalliferous material only, or a mixture that includes carbonaceous material and metalliferous material. The mixture may include flux material.

The present invention also provides a method for injecting solid metalliferous material and solid carbonaceous material that includes injecting solid metalliferous material via a metalliferous material inlet into a passageway extending from a rearward end to a forward end of the lance and creating a flow of metalliferous material along the lance, and injecting solid carbonaceous material via a carbonaceous material inlet into the passageway downstream of the metalliferous material inlet to the passageway so that at least a part of the carbonaceous material forms a buffer zone between a wall of a tube that defines the passageway and metalliferous material flowing along the passageway.

The present invention also provides a solids injection lance that includes a tube that defines a passageway for solid feed material to be injected through the tube and has an inlet for solid feed material at a rear end, a separate inlet for solid feed material in a wall of the tube downstream of the rear inlet in the direction of movement of feed material along the passageway, and an outlet for discharging solid feed material at a forward end, and wherein the lance is adapted to supply feed material into the passageway via the downstream inlet so that at least a part of the feed material forms a buffer zone between a wall of a tube that defines the passageway and feed material flowing along the passageway.

The solid feed material may be any suitable material.

The solid feed material may include metalliferous material.

The solid feed material may include metalliferous material and carbonaceous material.

The solid feed material may include metalliferous material, carbonaceous material, and flux material.

In use, a delivery system supplies feed material into the passageway via the tube wall inlet in a direction that is transverse, typically perpendicular, to a direction of movement of feed material along the passageway whereby the flow of metalliferous material diverts the flow of the feed material into the passageway via the tube wall inlet to form the buffer zone.

The lance may include more than one tube wall inlet.

The tube wall inlets may be in selected locations around and/or along the length of the tube wall to promote the formation of the buffer zone.

The plurality of the tube wall inlets may be spaced around the circumference of the tube wall.

The plurality of the tube wall inlets may be spaced around the circumference of the tube wall at the same distance from the rear end of the solids injection tube.

The plurality of the tube wall inlets may be spaced around the circumference of the tube wall at different distances from the rear end of the solids injection tube.

The solids injection tube may include a venturi in a rearward section of the tube for accelerating solid feed material flowing through the venturi, with the venturi including a section that tapers inwardly from a wider rear end to a narrower forward end.

The tapered section of the venturi may be downstream of the rear inlet and downstream of the tube wall inlet so that in use the buffer zone extends at least partly along the length of the tapered section.

The tapered section is a region of high abrasive wear due to acceleration of metalliferous material in the tapered section and it is therefore highly advantageous for the buffer zone to extend at least partly along, and preferably all of the way along, the length of the tapered section to reduce abrasive wear in the tapered section.

The positive influence of the buffer zone may extend as far as possible after the tapered section in the tube where the wear remains an issue.

The solids injection tube may have a constant cross-sectional area along the length of the tube between the tapered section of the venturi and the forward end of the tube.

The lance may be a water-cooled lance.

The lance may include an outer annular jacket extending along a substantial part of the length of the lance and a water-cooling system housed in the annular jacket.

The lance may include a puncture detection system that is adapted to detect a change of pressure in the solids injection tube or a flow of a gas into or from the tube as a result of a puncture in the tube.

The puncture detection system may be as described in Australian provisional application 2013901599 in the name of the applicant, and the disclosure in the patent specification lodged with the provisional application is incorporated herein by cross-reference.

The solids injection tube may be centrally-located in the lance.

The tube may comprise an assembly of an outer tube of a structural material and an inner tube of a wear resistant material that are bonded together.

The outer tube may be formed from a steel, such as a stainless steel.

The outer tube may be at least 1 mm thick.

The thickness of the outer tube may be in the range of 3-30 mm.

The inner tube may be formed from a wear resistant lining made of a white cast iron, such as a ferrochromium white cast iron, ceramic or a mixture of both.

The wear resistant lining may be at least 3 mm thick and more preferably at least 5 mm thick.

The bond between the outer tube and the inner tube may extend at least substantially across the whole of the surface area of the interface between the two tubes.

The bond between the outer tube and the inner tube in case of metallic liner may be a metallurgical bond.

The tube may be at least 2 m long.

The tube may have a minimum internal diameter of 50 mm.

The tube may have a maximum internal diameter of 300 mm.

The tube may have a maximum external diameter of 400 mm.

The present invention also provides an apparatus for supplying a solid feed material to a solids injection lance, including:

(a) a solid feed material delivery system for supplying solid feed material to the inlet at the rear end of the above-described solids injection lance, the delivery system including a storage/dispensing unit and a solids supply line for supplying metalliferous material from the storage/dispensing unit to the lance; and (b) a delivery system for supplying solid feed material to the inlet in the tube wall of the above-described solids injection lance, the delivery system including a storage/dispensing unit and a solids supply line for supplying the other feed material from the storage/dispensing unit to the lance.

The solid feed material may be any suitable material.

The solid feed material may include metalliferous material.

The solid feed material may include metalliferous material and carbonaceous material.

The solid feed material may include metalliferous material, carbonaceous material, and flux material.

The present invention also provides an apparatus for supplying at least a solid metalliferous material to a solids injection lance, including:

(a) a solid metalliferous material delivery system for supplying solid metalliferous material to the above-described solids injection lance, the delivery system including a storage/dispensing unit and a solids supply line for supplying metalliferous material from the storage/dispensing unit to the lance; and (b) a delivery system for supplying another feed material to the above-described solids injection lance, the delivery system including a storage/dispensing unit and a solids supply line for supplying the other feed material from the storage/dispensing unit to the lance.

The other feed material may be a carbonaceous material only, a metalliferous material only, or a mixture of carbonaceous material and metalliferous material.

The metalliferous material may be iron ore, preferably iron ore fines.

When the solid metalliferous material is iron ore, preferably the iron ore is at a temperature of at least 500° C. in the solids supply line.

The solid carbonaceous material may be coal.

The present invention further provides a direct smelting plant that includes a direct smelting vessel having the solids injection lance described above.

The present invention also provides a direct smelting plant including:

(a) a direct smelting vessel having the above-described solids injection lance for injecting solid metalliferous material and solid carbonaceous material into the vessel; and
(b) the above-described material supply apparatus.

The plant may include a pre-treatment unit for heating solid metalliferous material.

The solid metalliferous material may be iron ore, preferably iron ore fines.

When the solid metalliferous material is iron ore, preferably the iron ore is at a temperature of at least 500° C. in the solids supply line.

The solid carbonaceous material may be coal.

The present invention further provides a molten bath-based direct smelting process for producing a molten metal from a solid metalliferous feed material that includes injecting a solid feed material selected from one or more than one of a solid metalliferous material and a solid carbonaceous material into a molten bath in a direct smelting vessel via the solids injection lance described above.

One example of a metalliferous material is iron ore.

The iron ore may be iron ore fines.

The iron ore may be pre-heated to a temperature of at least 600° C.

The process may include injecting metalliferous material, carbonaceous material, a flux material or any other solid material into the smelting vessel containing a bath of molten material in the form of molten metal and molten slag and generating a bath/slag fountain via gas evolution in the molten bath and generating an offgas and smelting metalliferous material in the molten bath and forming molten metal.

The process may include preheating the metalliferous material by combusting a fuel gas at a temperature of less than 300° C., with the fuel gas being produced from offgas discharged from the smelting vessel. The fuel gas may be a fuel gas produced from hot off-gas released from the smelting vessel and cooled to the temperature of less than 300° C.

When the solid metalliferous material is iron ore and the solid carbonaceous material is coal, the process may comprise supplying a total of at least 160 t/h ore and at least 70 t/h coal to the direct smelting vessel.

The process may include supplying heated solid metalliferous material and solid carbonaceous material to the direct smelting vessel via the lance with a pressure drop of 1.0 to 2.0 bar(g).

The present invention also provides a process for direct smelting solid metalliferous material and producing molten metal including:
(a) forming a bath of molten metal and slag in a direct smelting vessel;
(b) supplying solid metalliferous material and solid carbonaceous material into the vessel, including supplying any one or more than one of solid metalliferous material and solid carbonaceous material via above-described solids injection lance extending into the vessel;
(c) injecting oxygen-containing gas into the vessel and post-combusting combustible gases generated in the vessel; and
(d) smelting solid metalliferous material to molten metal in the bath.

The solid metalliferous material may be iron ore, preferably iron ore fines.

When the solid metalliferous material is iron ore, preferably the iron ore is at a temperature of at least 500° C. in the solids supply line.

The solid carbonaceous material may be coal.

When the solid metalliferous material is iron ore and the solid carbonaceous material is coal, the process may comprise supplying a total of at least 160 t/h ore and at least 70 t/h coal to the direct smelting vessel.

The process may comprise supplying heated solid metalliferous material and solid carbonaceous material to the direct smelting vessel via the lance with a pressure drop of 1.0 to 2.0 bar(g).

BRIEF DESCRIPTION OF THE DRAWINGS

The invention is described further by way of example only with reference to the accompanying drawings, of which.

DESCRIPTION OF EMBODIMENT

Figure 1:
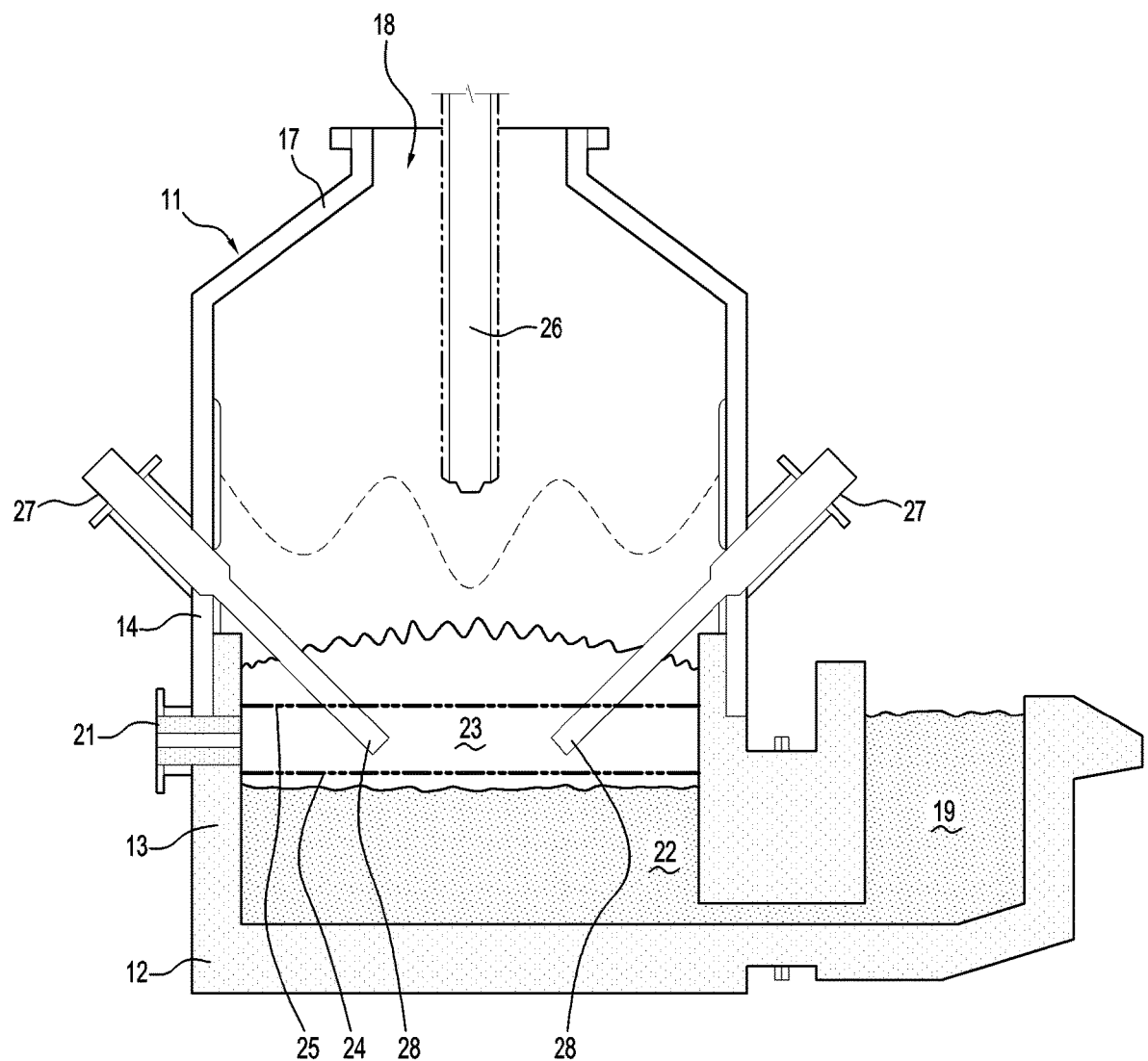
FIG. 1 is a vertical cross-section through a direct smelting vessel that forms part of an embodiment of a direct smelting plant in accordance with the present invention.

FIG. 1 shows a direct smelting vessel 11 that is suitable particularly for carrying out the HIsmelt process as described by way of example in International patent application PCT/AU96/00197 (WO 1996/031627) in the name of the applicant.

The following description is in the context of smelting iron ore fines to produce molten iron in accordance with the HIsmelt process.

It will be appreciated that the present invention is applicable to smelting any metalliferous material, including ores, partly reduced ores, and metal-containing waste streams via any suitable molten bath-based direct smelting process and is not confined to the HIsmelt process. It will also be appreciated that the ores can be in the form of iron ore fines.

The following description focuses on co-injection of metalliferous material and carbonaceous material via a solids injection lance, but as will be appreciated from the above, the invention is not limited to co-injection of these materials and also extends to injection of metalliferous material without carbonaceous material.

The following description focuses on co-injection of metalliferous material and carbonaceous material to minimise abrasive wear and thermal shock of a solids injection lance. However, as will be appreciated from the above, the invention is not so limited and extends to situations where minimising abrasive wear is a major consideration compared to minimising thermal shock, and vice versa.

The vessel 11 has a hearth that includes a base 12 and sides 13 formed from refractory bricks, side walls 14, which form a generally cylindrical barrel extending upwardly from the sides 13 of the hearth, and a roof 17. Water-cooled panels (not shown) are provided for transferring heat from the side walls 14 and the roof 17. The vessel 11 is further provided with a forehearth 19, through which molten metal is continuously discharged during smelting, and a tap-hole 21, through which molten slag is periodically discharged during smelting. The roof 17 is provided with an outlet 18 through which process off gases are discharged.

In use of the vessel 11 to smelt iron ore fines to produce molten iron in accordance with the HIsmelt process, the vessel 11 contains a molten bath of iron and slag, which includes a layer 22 of molten metal and a layer 23 of molten slag on the metal layer 22. The position of the nominal quiescent surface of the metal layer 22 is indicated by arrow 24. The position of the nominal quiescent surface of the slag layer 23 is indicated by arrow 25. The term "quiescent surface" is understood to mean the surface when there is no injection of gas and solids into the vessel 11.

The vessel 11 is provided with solids injection lances 27 that extend downwardly and inwardly through openings (not shown) in the side walls 14 of the vessel and into the slag layer 23. The solids injection lances 27 are described in more detail in relation to FIGS. 3 and 4. Two solids injection lances 27 are shown in FIG. 1. However, it can be appreciated that the vessel 11 may have any suitable number of such lances 27. In use, heated iron ore fines and ambient temperature coal (and fluxes, typically lime) are entrained in a suitable carrier gas (such as an oxygen-deficient carrier gas, typically nitrogen) and are separately supplied to the lances 27 and co-injected through outlet ends 28 of the lances 27 into the molten bath and preferably into metal layer 22. The following description is in the context that the carrier gas for the iron ore fines and coal is nitrogen.

The outlet ends 28 of the solids injection lances 27 are above the surface of the metal layer 22 during operation of the process. This position of the lances 27 reduces the risk of damage through contact with molten metal and also makes it possible to cool the lances by forced internal water cooling, as described further below, without significant risk of water coming into contact with the molten metal in the vessel 11.

The vessel 11 also has a gas injection lance 26 for delivering a hot air blast into an upper region of the vessel 11. The lance 26 extends downwardly through the roof 17 of the vessel 11 into the upper region of the vessel 11. In use, the lance 26 receives an oxygen-enriched hot air flow through a hot gas delivery duct (not shown), which extends from a hot gas supply station (also not shown).

Figure 2:
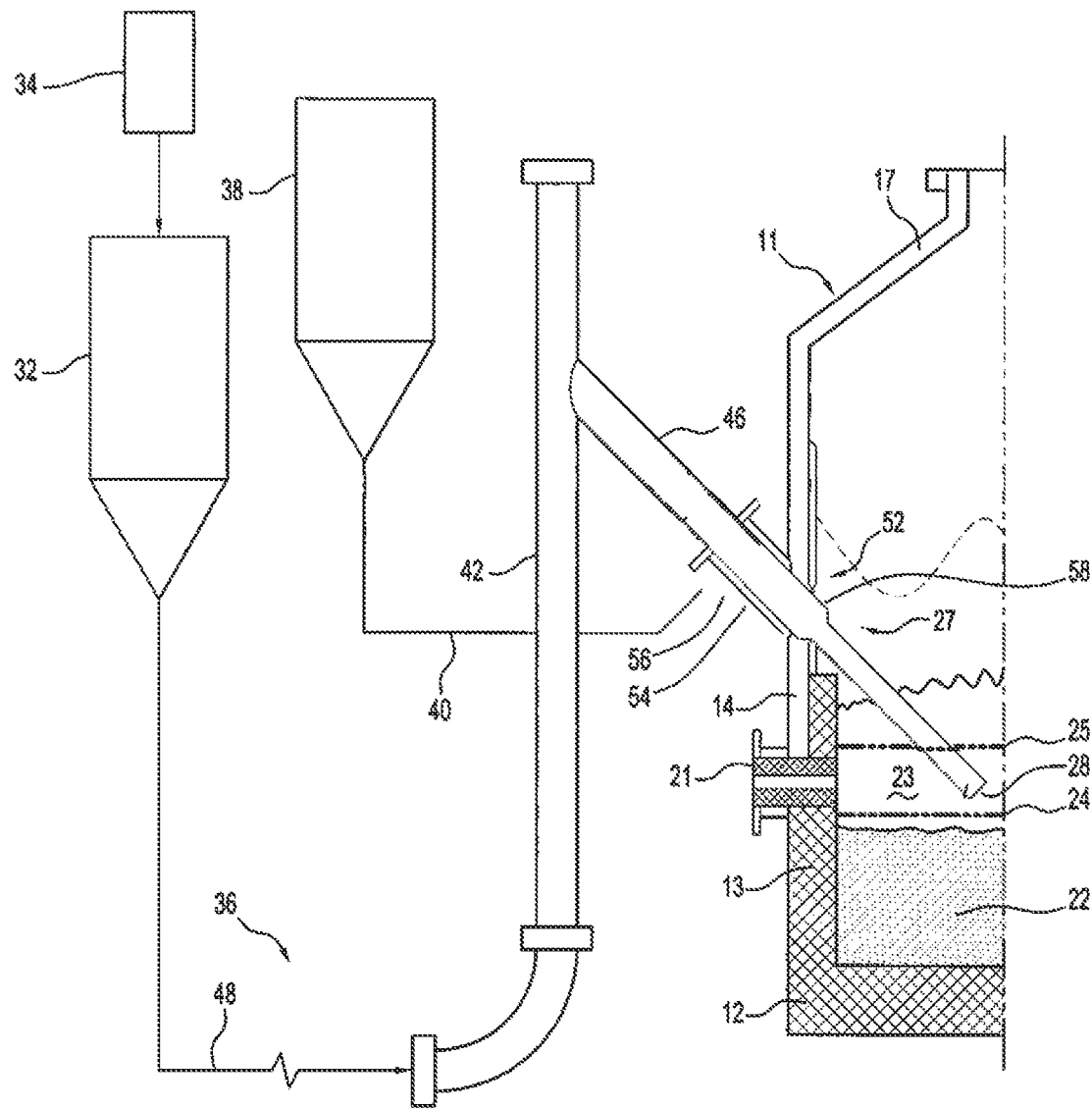
FIG. 2 is a schematic view that illustrates the above-mentioned embodiment of the direct smelting plant.

FIG. 2 shows schematically one embodiment of a direct smelting plant in accordance with the invention insofar as the plant is concerned with supplying heated iron ore fines and ambient temperature coal to one solids injection lance 27.

The plant includes the direct smelting vessel 11 shown in FIG. 1.

The plant also includes a pre-treatment unit 34 in the form of a pre-heater for heating iron ore fines, typically to a temperature of at least 600° C. The pre-heater may be any suitable type of pre-heater.

The plant also includes an ore delivery system for supplying iron ore fines to the lances 27.

The ore delivery system includes (a) an ore storage/dispensing unit 32 for storing and dispensing heated iron ore fines and (b) an ore supply line 36 for supplying heated ore from the ore storage/dispensing unit 32 to the lances 27.

The ore storage/dispensing unit 32 is constructed to store and dispense heated iron ore fines entrained in nitrogen carrier gas. The ore storage/dispensing unit 32 can be in the form of a plurality of bins that allow heated iron ore fines to be transferred from standard atmospheric conditions to an environment of pressurized carrier gas. However, for the purposes of the present invention, the ore storage/dispensing unit 32 can be considered as a single unit.

In use, iron ore fines are fed to the pre-heater 34 from a stockpile (not shown) and the pre-heater heats the fines. The pre-heater 34 is arranged to heat the fines such that the fines are at a temperature of at least 500° C. and typically of the order of 600° C. to 700° C. at the point of injection into the vessel 11. Off gases can be supplied from the outlet 18 to the pre-heater 34, such that heat can be transferred from the off gases to the iron ore fines. The pre-heater 34 is arranged to supply the heated iron ore fines to the ore storage/dispensing unit 32.

The ore supply line 36 for transporting heated iron ore fines from the storage/dispensing unit 32 to the lance 27 includes (a) a first section 48 that carries the fines to a location proximate the vessel 11, (b) an upwardly extending section 42 which conveys the fines from a position that is approximately level with the base 12 of the vessel 11 to at least the height of the lance 27, and (c) a downwardly extending section 46 which connects the line to an ore inlet in the lance 27. The section 46 is formed to be co-axial with the lance 27 when in an operating position as shown in FIG. 2. The ore inlet in the lance 27 and the overall construction of the lance 27 is described in more detail in relation to FIGS. 3 and 4.

The plant also includes a coal delivery system for supplying coal to the lances 27.

The coal delivery system includes (a) a coal storage/dispensing unit 38 which receives coal from a stockpile (not shown) and stores and dispenses the coal under ambient temperature and (b) a supply line 40 for transporting coal from the coal storage/dispensing unit 38.

In use, coal at ambient temperature is discharged from the coal dispensing assembly 38 entrained in nitrogen carrier gas and transferred via the coal supply line 40 to the lance 27.

The coal storage/dispensing unit 38 can be in the form of a plurality of bins that allow coal to be transferred from standard atmospheric conditions to an environment of a pressurized nitrogen carrier gas. However, for the purposes of the present invention, the coal dispensing assembly 38 can be considered to be a single unit.

The coal supply line 40 is connected to a coal inlet in the lance 27. The coal inlet in the lance 27 and the overall construction of the lance 27 is described in more detail in relation to FIGS. 3 and 4. Typically, the coal delivery system supplies coal and flux material, such as lime.

Figure 3:
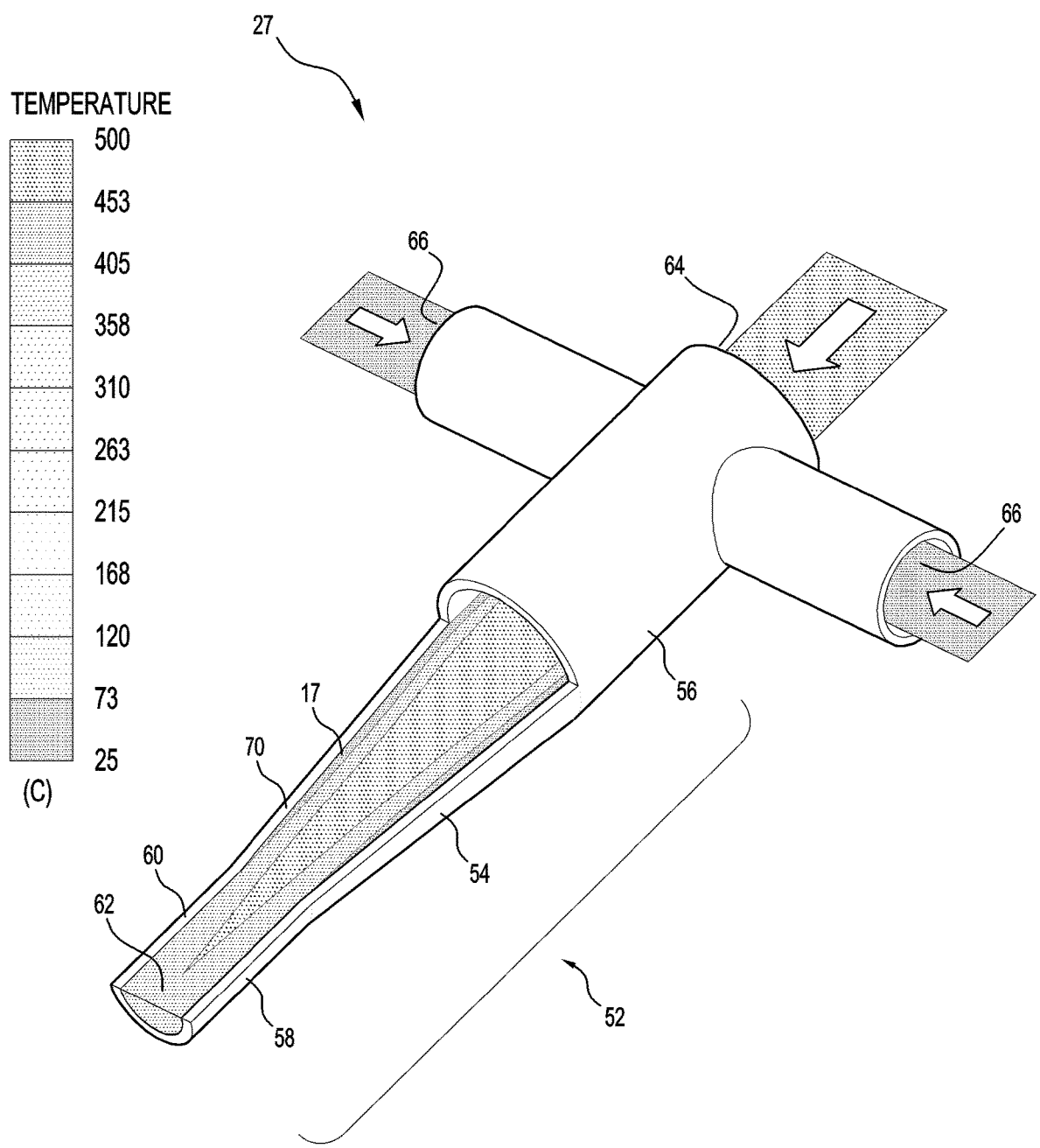
FIG. 3 is a diagrammatic partly cross-sectional view of an upper section of an embodiment of a solids injection lance shown in FIGS. 1 and 2 with temperature contours for the hot ore and ambient temperature coal/lime injected via the lance.

FIG. 3 is a diagrammatic partly cross-sectional view of an upper section of the solids injection lance 27 shown in FIGS. 1 and 2 with temperature contours for the hot iron ore fines and ambient temperature coal (and lime) injected via the lance 27.

Figure 4:
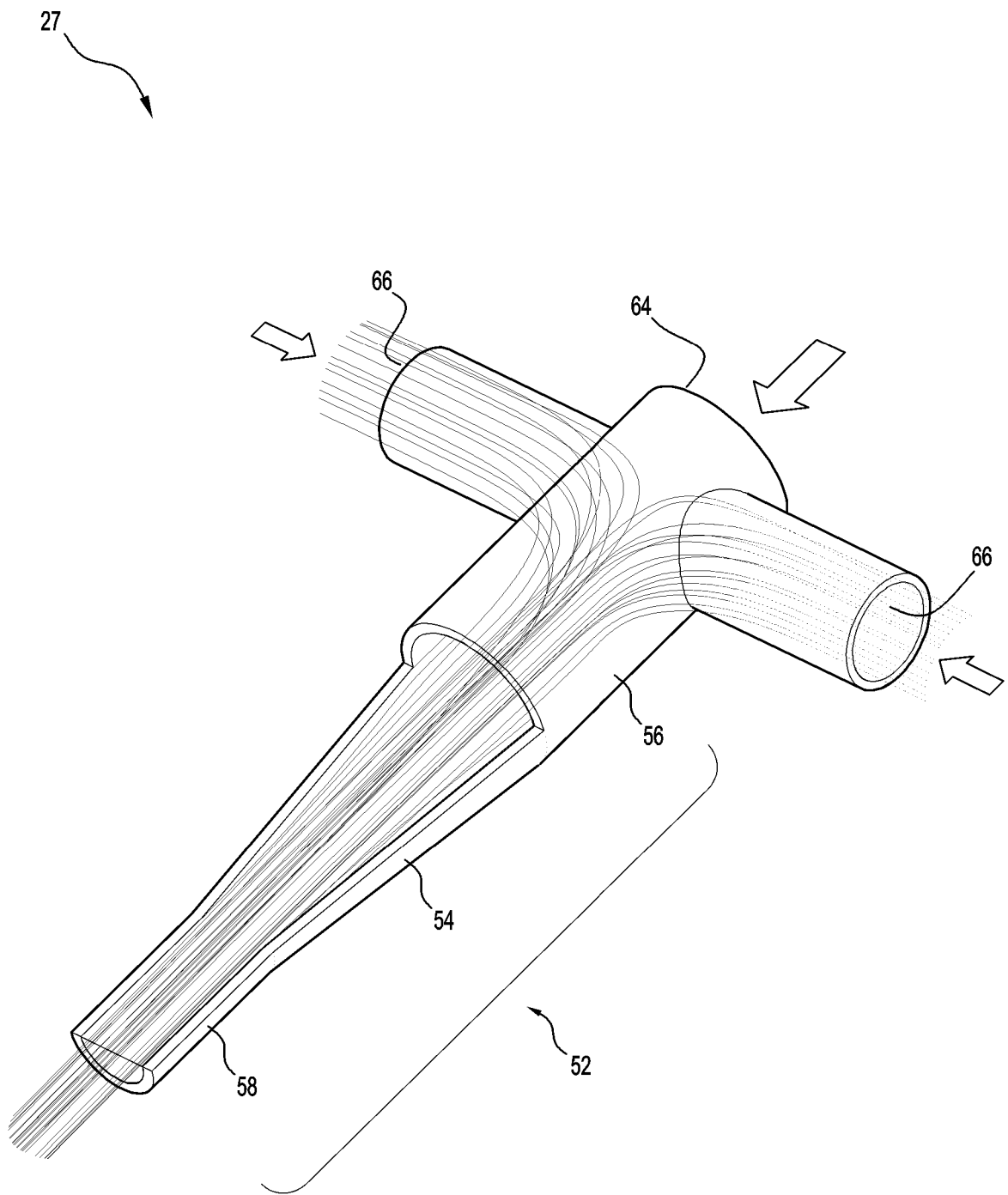
FIG. 4 is the diagrammatic partly cross-sectional view shown in FIG. 3 with coal tracks illustrating the flow of coal through the lance.

FIG. 4 is the diagrammatic partly cross-sectional view shown in FIG. 3 with coal tracks illustrating the flow of coal through the lance 27.

With reference to FIGS. 3 and 4, the lance 27 includes a tube 60 that defines a passageway 62 for solid feed material to be injected through the tube 60 and to exit the lance 27 via the outlet end 28 of the lance shown in FIGS. 1 and 2.

The tube 60 has a venturi generally identified by the numeral 52 at an upper end section of the tube 60 for accelerating solid feed material flowing through the venturi. The venturi 52 includes a wider rear end section 56, a narrower forward end section of the venturi 58, and a section 54 that tapers inwardly from the wider section 56 to the narrower section 58.

The remainder of the tube 60 extending from the venturi 52 to the forward end 28 of the lance 27 has a uniform cross-section.

The tube 60 has an inlet 64 for heated iron ore fines at a rear end of the tube 60 and a pair of diametrically-opposed separate inlets 66 for coal in the tube 60 downstream of the ore inlet 64. The coal inlets 66 are formed in the wider section 56 of the venturi 52. The ore inlet 64 and the coal inlets 66 are arranged to create flow conditions in the passageway 62 so that in use at least a part of the coal supplied into the passageway 62 via the coal inlets 66 forms a buffer zone 70 between the tube wall and the iron ore fines flowing in a central section of the passageway 62. Coal is less abrasive than iron ore fines and therefore the buffer zone 70 reduces abrasive wear of the material that forms the wall of the tube 60. In addition, in situations where the iron ore fines are hot and the coal is at an ambient temperature, as is the case in the described embodiment, the buffer zone 70 minimises thermal shock that could reduce the effective life of the tube wall.

There may be any suitable number and arrangement of coal inlets 66. The coal inlets 66 may be at the same position along the length of the tube 60 and/or at spaced intervals along the length of the tube 60.

The locations and numbers of the coal inlets 66 are selected in relation to the ore inlet 64 and the injection parameters (volumetric flow rates, injection velocities, particle size distributions, etc) for the coal and the iron ore fines such that the flow of iron ore fines in the passageway 62 divert the transverse, typically perpendicular flow of coal into the passageway 62 via the coal inlets 66 such that the direction of flow of sufficient of the injected coal is diverted to form the buffer zone 70.

The tapered section 54 of the venturi 52 is a region of high abrasive wear due to acceleration of feed materials in the tapered section and it is therefore highly advantageous for the buffer zone 70 to extend at least partly along, and preferably all of the way along, the length of the tapered section 54 to reduce abrasive wear in the tapered section 54.

Basically, the method may include selecting the operating conditions, such as the injection flow rates and injection velocities to form the buffer zone 70 so that it extends along the required length of the tube to shield sections of the tube that are susceptible to high abrasive wear and thermal shock.

FIGS. 3 and 4 include temperature contours that illustrate the temperature in the lance 27 in the described embodiment where there is injection of hot iron ore fines and ambient temperature coal. It is evident that the temperature in the buffer zone 70 is considerably lower than in the central section of the passageway 62.

FIG. 4 also includes tracks that illustrate the paths of movement of coal in the passageway 62. In particular, the Figure illustrates how the forward flow of iron ore fines in the passageway 62 diverts the flow of coal in the passageway under the particular injection conditions for the Figure.

The advantages provided by the buffer zone 70 reduce the current requirements for high wear resistant and thermal shock resistant materials for the tube wall, which tend to be a limited range of expensive materials, and opens up the possibility of using a wider range of less expensive materials.

It is noted that from a practical perspective the buffer zone 70 may not be a continuous zone and may not be a uniform thickness and there may be iron ore fines in the zone. However, even in this situation, from a comparative viewpoint, the buffer zone 70 as described in relation to FIGS. 3 and 4 will reduce the abrasive wear and thermal shock issues compared to situations in which there is no buffer zone and a mixture of iron ore fines and coal is flowing along the passageway 62.

It is also noted that ultimately there will be mixing of the materials in the buffer zone 70 and a central section of the passageway 62 as the materials flow along the passageway 62 so that there is a uniform mixture of iron ore fines and coal flowing along the passageway 62.

Many modifications may be made to the embodiment of the solids injection lance of the present invention described in relation to the Figures without departing from the spirit and scope of the invention.

By way of example, whilst the embodiment of the solids injection lance is described in the context of the HIsmelt direct smelting process, it can readily be appreciated that the present invention is not so limited and extends to any molten bath-based smelting process.

By way of example, whilst the embodiment of the solids injection lance is described in the context of smelting iron ore, it can readily be appreciated that the present invention is not limited to this material and extends to any suitable metalliferous material.

By way of example, whilst the embodiment of the solids injection lance is described in the context of injecting solid feed materials in the form or iron ore and carbonaceous material, it can readily be appreciated that the present invention is not so limited and extends to injecting any suitable feed material.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A method for injecting solid metalliferous material and solid carbonaceous material that includes injecting a solid metalliferous material via a metalliferous material inlet into a passageway extending from a rearward end to a forward end of a lance and creating a flow of metalliferous material along the lance, and injecting solid carbonaceous material in a direction that is transverse to a direction of movement of the metalliferous material via a carbonaceous material inlet into the passageway downstream of the metalliferous material inlet to the passageway so that at least a part of the carbonaceous material forms a buffer zone between a wall of a tube that defines the passageway and the metalliferous material flowing along the passageway.

2. A solids injection lance that includes a tube that defines a passageway for solid metalliferous material and solid carbonaceous material to be injected through the tube and has a rear inlet for solid metalliferous material at a rear end, a separate tube wall inlet arranged transversely to the rear inlet, for solid carbonaceous material injection in a direction that is transverse to a direction of movement of the solid metalliferous material injected at the rear inlet, in a wall of the tube downstream of the rear inlet, and an outlet for discharging solid feed material at a forward end, and wherein at least a part of the carbonaceous material forms a buffer zone between a wall of a tube that defines the passageway and metalliferous material flowing along the passageway.

3. The lance defined in claim 2 includes more than one tube wall inlet downstream of the rear inlet, in the wall of the tube.

4. The lance defined in claim 3 wherein the tube wall inlets in the wall of the tube are selected at locations around and/or along the length of the wall of the tube to promote the formation of the buffer zone.

5. The lance defined in claim 3 wherein the plurality of the tube wall inlets is spaced around the circumference of the wall of the tube.

6. The lance defined in claim 2 wherein the solids injection tube includes a venturi in a rearward section of the tube for accelerating solid metalliferous material and solid carbonaceous material flowing through the venturi, with the venturi including a section that tapers inwardly from a wider rear end to a narrower forward end.

7. The lance defined in claim 6 wherein the tapered section of the venturi is downstream of the rear inlet at the rear end and downstream of the tube wall inlet at the wall of the tube so that in use the buffer zone extends at least partly along the length of the tapered section.

8. The method defined in claim 1 wherein the carbonaceous material is at ambient temperature and the metalliferous material is pre-heated.

9. The method defined in claim 1 wherein the carbonaceous material and the metalliferous material are at ambient temperature.

10. The method defined in claim 1 includes forming the buffer zone so that the buffer zone extends at least partly along the length of a tapered section of a venturi in a section of the tube that accelerates solid metalliferous material and solid carbonaceous material flowing in the passageway.

11. The method defined in claim 1 includes forming the buffer zone so that the buffer zone extends along the whole of the length of a tapered section of a venturi.

12. The method defined in claim 8 includes forming the buffer zone so that the buffer zone extends along the whole of the length of a tapered section of a venturi and forwardly of the tapered section.

13. The method defined in claim 1 includes establishing a flow of feed material in the form of metalliferous material along the passageway and supplying a flow of other feed material into the passageway in a direction that is transverse to the direction of movement of the metalliferous material along the passageway whereby the flow of metalliferous material diverts the flow of the other feed material into the passageway to form the buffer zone.

14. The method defined in claim 13 wherein the other feed material is a carbonaceous material only, a metalliferous material only, or a mixture that includes carbonaceous material and metalliferous material.

15. The method of claim 13 wherein the supplying a flow of another feed material into the passageway in a direction that is perpendicular to the direction of movement of the metalliferous material along the passageway.

* * * * *